United States Patent [19]

Lehmann

[11] Patent Number: 4,523,078
[45] Date of Patent: Jun. 11, 1985

[54] PORTABLE ELECTRICALLY HEATED WARMING CONTAINER FOR TRANSPORTING INFUSIONS IN A RESCUE VEHICLE

[75] Inventor: J. C. Ludwig Lehmann, Lorch, Fed. Rep. of Germany

[73] Assignee: Binz GmbH & Co., Fed. Rep. of Germany

[21] Appl. No.: 463,060

[22] Filed: Feb. 1, 1983

Related U.S. Application Data

[63] Continuation of Ser. No. 174,747, Aug. 4, 1980, abandoned.

[30] Foreign Application Priority Data

Aug. 3, 1979 [DE] Fed. Rep. of Germany ... 7922217[U]

[51] Int. Cl.³ .................. H05B 1/00; A47J 36/24
[52] U.S. Cl. .................. 219/202; 219/214; 219/386; 219/387; 219/432; 224/311; 604/114
[58] Field of Search .............. 219/202, 386, 387, 214, 219/385, 218, 432; 224/273, 275, 311, 315, 42.32; 99/324; 604/113, 114

[56] References Cited

U.S. PATENT DOCUMENTS

| | | | |
|---|---|---|---|
| 1,393,751 | 10/1921 | Chapin | 219/432 |
| 1,683,889 | 9/1928 | Hayne | 219/202 X |
| 2,205,884 | 6/1940 | Greenman | 219/386 X |
| 2,466,418 | 4/1949 | Gunther | 219/432 |
| 2,576,874 | 11/1951 | Acton | 219/387 |
| 2,675,457 | 4/1954 | Privett | 219/387 |
| 2,795,684 | 6/1957 | Eranosian | 219/202 X |
| 2,861,171 | 11/1958 | Adler | 219/214 |
| 3,002,665 | 10/1961 | Allen | 224/44.32 |
| 3,539,773 | 11/1970 | Wilson | 219/202 X |
| 3,619,563 | 11/1971 | Hirst | 219/202 |
| 3,624,346 | 11/1971 | Guth | 219/202 X |
| 3,808,401 | 4/1974 | Wright et al. | 219/202 X |
| 3,915,079 | 10/1975 | Balderson | 219/202 X |
| 4,163,896 | 8/1979 | McAvinn et al. | 219/386 X |

FOREIGN PATENT DOCUMENTS

58409  10/1946  Netherlands .................. 219/432

OTHER PUBLICATIONS

"Warmth-Holding Container for Infusions in Rescue Vehicles", by Herbert Mueller; Laben Retten (Saving Lives), vol. 3, 1977, p. 31.

Primary Examiner—A. Bartis
Attorney, Agent, or Firm—Craig & Burns

[57] ABSTRACT

A portable electrically heated warming container arrangement for transporting infusions or the like in rescue vehicles includes a thermally insulated case having a flat bottom and an electric heater for heating a plurality of infusion containers carried in the case. A electrical connector plug for detachably connecting the electric heater to the rescue vehicle power supply is provided in the flat bottom of the case and is recessed so as to the flush with the flat bottom. During transport, the case is positioned within a transport casing secured to a wall of the rescue vehicle. The casing has a flat bottom and low side walls defining an upwardly open receiving space snugly surrounding the lower portion of the case for securing the case against sliding and tipping. The flat bottom of the casing is provided with an upstanding complementary electrical plug-in connector member connected to the rescue vehicle power supply and positioned to detachably engage the connector plug in the case bottom when the case is inserted into the receiving space of the transport casing to establish connection of the heater to the rescue vehicle power supply. The case is provided with a further electrical connector for permitting energization of the heating element from a nonvehicular power supply when removed from the rescue vehicle. The transport casing may be designed to receive and support a plurality of such cases.

5 Claims, 4 Drawing Figures

ELECTRIC HEATING ELEMENT

PORTABLE ELECTRICALLY HEATED WARMING CONTAINER FOR TRANSPORTING INFUSIONS IN A RESCUE VEHICLE

This is a continuation of application Ser. No. 174,747, filed Aug. 4, 1980, now abandoned.

The invention relates to a warming container with an electrical heater for transporting infusions or the like in rescue vehicles, wherein the heater can be connected to the electrical wiring system of the vehicle.

In the treatment of shock conditions or for the compensation of loss of blood, it is customary to administer infusions with blood surrogate solutions to patients. Bottles and containers with such infusion solutions or also with sodium bicarbonate solutions are, therefore, carried along in rescue vehicles, rescue helicopters, or ambulances or the like. The bottles or containers are stored in a fixedly installed cabinet, or they are carried along in portable so-called medical bags also housing the emergency instruments and appliances.

The infusion solutions must have a temperature of at least 20° C. when being infused, in order to prevent damage to the patient's health. A higher temperature is not deleterious to the patient, but reduces the shelf life of the solutions. Particularly during the cold time of the year, the solutions easily cool off to below the permissible limit when left in a vehicle which is at a standstill for a relatively long period of time.

A warming container with an electrical heater has been known, which latter can be connected to the wiring system of the rescue vehicles by way of connecting cables. Such loose cable connections are impractical during an emergency, since they impede the medical personnel and physicians and can result in accidents because of the danger of stumbling over them, and during such occurrences the cables can be readily torn off.

It is, therefore, an object of the invention to provide a warming container satisfying increased safety requirements and simultaneously affording an easier manipulation.

This object has been attained by a warming container of the type mentioned in the foregoing, which container is characterized according to the invention by the feature that the warming container has a connector member connected to the heater, the reception opening of which, intended for a complementary plug-in member, lies on the outside of the warming container. Thus, no loose cables connected to the warming container are necessary. The connecting lines from the current source which is part of the vehicle to the location of the warming container in the respective rescue vehicle can be fixedly installed.

According to an advantageous embodiment, the provision is made that the receptacle of the connector member terminates on the outside flush with the wall surface of the warming container, so that neither a collar, which may surround the receptacle, nor contact elements or the like project from the wall surface. Consequently, it is practically impossible to damage the connector member or to incur injuries by the connector member, even during usage in critical emergencies.

Preferably the connector member is arranged in the surface of the warming container upon which it stands so that, in the respective rescue vehicle, the corresponding complementary plug-in member can be fixedly installed on the depositing surface for the warming container, and the warming container need merely be placed on top of the plug-in member to connect the container heater.

According to an especially preferred embodiment, the warming container comprises a transport casing encompassing the warming container snugly at least in part and thus securing same against sliding, with a surface covering the connector member, especially a bottom surface, at which the complementary plug-in member is arranged. This transport casing can be fixedly installed in the rescue vehicle or aircraft. Besides, this facilitates the series outfitting of rescue vehicles with portable warming containers, since no additional constructional measures are required to be performed on the vehicle for securing the transportation of the warming container. It is sufficient to provide adequate space in the rescue vehicle for the unit consisting of warming container and transport casing.

To facilitate use of the warming container and to make it superfluous to effect an exact adjustment of connector member and plug-in member, the connector member and/or the plug-in member can be elastically displaceable and/or rotatable and/or tiltable perpendicularly to the plug-in direction.

Furthermore, the plug-in member and the connector member can have mutually centering guides. In this way, the plug-in member attached to the transport casing can be readily inserted in the connector member at the warming container even with a slight mutual displacement of the connector member and plug-in member, and even if handled carelessly.

To be able to operate the warming container also outside of a vehicle with normal mains voltage, an additional connector member for normal mains voltage can be provided.

An especially preferred embodiment will be explained hereinbelow with reference to the drawing wherein.

Figure 1:
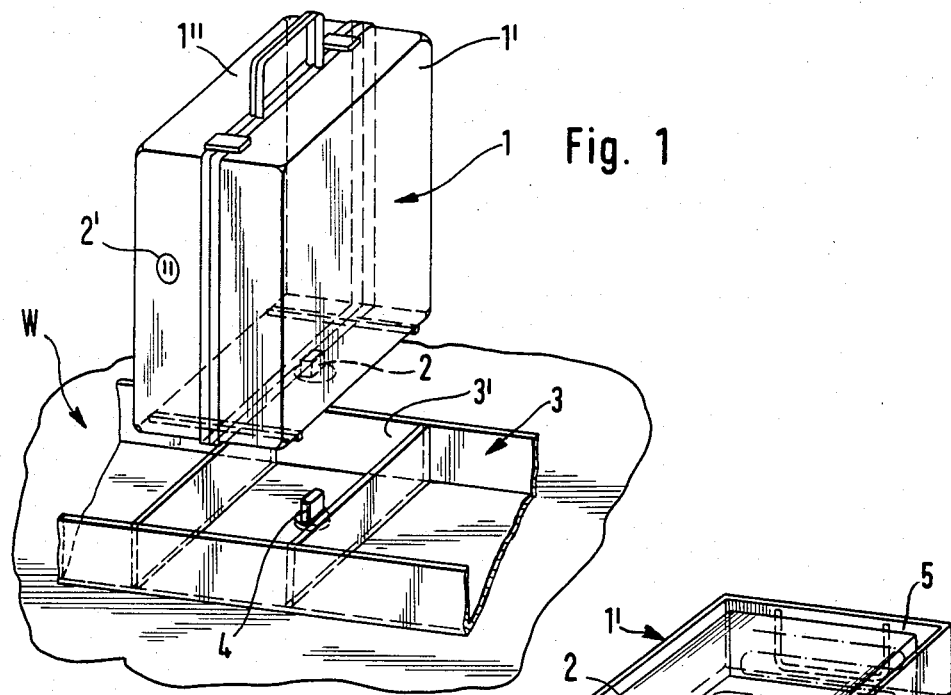
FIG. 1 shows a perspective view of the warming container and the associated transport casing.
Figure 3:
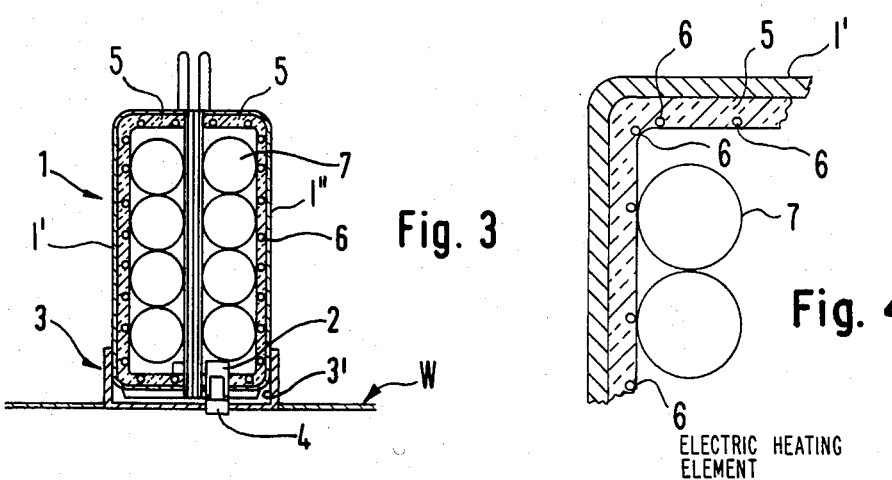
FIG. 3 shows a sectional view of the warming container, inserted in the transport casing, wherein the section plane extends at right angles to the longitudinal direction of the warming container.

A warming container 1 having a shape similar to a suitcase and consisting of two halves 1' and 1" can be inserted in a transport casing 3, preferably designed for several warming containers 1, this casing having a trough shape and one or more receiving spaces defined by rim walls 3' that snugly encompass the warming container 1 at its bottom surface in a manner, securing the container against sliding and tipping. The casing 3 is fixedly installed in the vehicle, such as to a vehicle wall W. As shown in FIGS. 1 and 3, a connector member 2 is arranged in the bottom surface of the warming container 1, this connector having no parts whatsoever which would project from the bottom surface toward the outside. Upon insertion of the warming container 1, this connector member 2 receives a plug-in member 4 arranged on the floor surface of the transport casing 3, so that an electrical heating unit 6 arranged within the warming container 1 on the wall thereof is connected with a current source, not shown, via the connector member 2 and the plug-in member 4 and a connecting line, not shown, connected with these members. A further connector 2', connected to the heating element 5 of container 1, enables use of warming container 1 outside of a vehicle with normal mains voltage. For this purpose, commercially available plugs that are combined with a voltage converter may be used.

Figure 4:
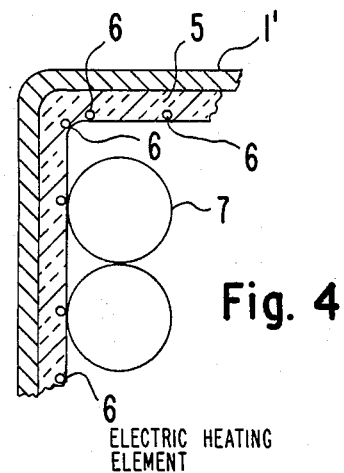
FIG. 4 shows an enlarged portion of FIG. 3.

As shown in FIG. 3 and in FIG. 4 which shows an enlarged view of a portion of the structure of FIG. 3, between the heater 6 and the outer surfaces of the warming container 1, a thermal insulation 5 is provided so that low power is sufficient for the heater 6, see FIG. 4.

Numeral 7 denotes bottles or the like for infusion solutions. These bottles are housed within storing troughs, not shown, cushioned, so that the bottles are secured against vibrations and, in particular, cannot hit against each other.

Figure 2:
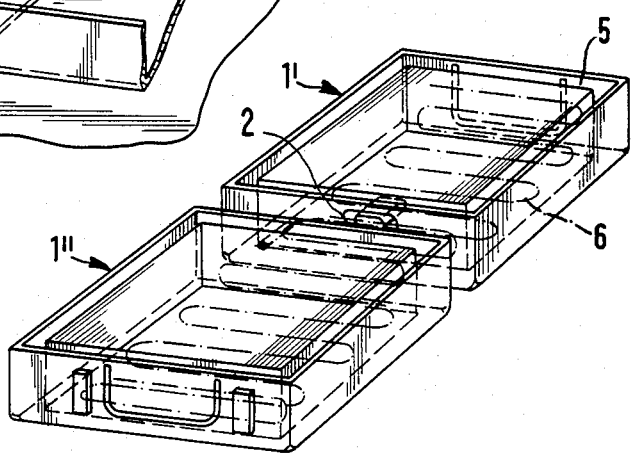
FIG. 2 shows the warming container in the flipped-open condition.

The halves 1', 1" of the warming container are connected, for example, by hinge elements meshing in a hook-like fashion, so that the halves, after opening the warming container, can be separated from each other, as shown in FIG. 2.

In the illustrated example, the connector member 2 is arranged in the half 1' of the warming container 1, so that the plug-in member 4 is arranged correspondingly by offset with respect to the longitudinal axis of the transport casing 3 on the bottom surface of the latter. However, it is also possible to locate the connector member 2 exactly at the point of intersection of the longitudinal and transverse axes of the warming container 1 on the bottom surface thereof. In this connection, it is sufficient to mechanically firmly connect the plug-in member 2 only with one half 1'. The other half 1" of the warming container 1 can then exhibit a corresponding recess for the part of the connector member 2 projecting into this half. With such an arrangement, the warming container can be inserted in the transport casing in any desired orientation, i.e. the half 1' can be on the right-hand side or on the left-hand side of FIG. 1. Corresponding considerations apply with regard to the half 1". The contact elements of connector member and plug-in member must be arranged in mirror-image symmetry to the longitudinal axis of the transport casing, for example concentrically to each other.

I claim:

1. A warming container arrangement for transporting of infusions or the like in a rescue vehicle, comprising a thermally insulated warming container case having a flat bottom wall and an interior space for receiving a plurality of containers to be warmed and an electrical heater operable by connection to the electrical system of a vehicle for warming containers received in said interior space, and a trough-shaped transport casing adapted to be fixedly installed in a vehicle and having a flat bottom wall and side walls which are low compared to the height of container case and which side walls define at least one receiving space open at the top side to at least partially snugly surround the warming container case in a manner securing same against sliding and tipping, wherein said electrical heater is detachably connectable to the electrical system of the vehicle by an electrical connecter having a plug-in electrical connector member adapted to be electrically connected to a vehicle power supply disposed on the bottom wall of the transport casing and by a complementary electrical connector member connected to said electric heater and positioned in a recess in the bottom wall of the case so as to be flush with the exterior bottom wall surface of the case and accessible externally thereof for receiving said plug-in electrical connector member upon insertion of said warming container case into said receiving space of the transport casing through said open top of said casing, said side walls of said casing acting in conjunction with the side walls of the case to guide a plug-in connector member and complementary electrical connector member into engagement as the case is inserted into the casing.

2. Warming container arrangement according to claim 1, wherein said warming container is of a suitcase shape divided vertically into two halve sections.

3. Warming container arrangement according to claim 2, wherein said complementary electrical connector member is located in a bottom wall of one of said halves.

4. A warming container arrangement according to claim 1, wherein said side walls of the troughshaped transport casing define a plurality of such receiving spaces each provided with such a plug-in electrical connector member, whereby plural warming container cases may be retained therein.

5. A warming container arrangement according to claim 1, wherein the container casing has a further connector member connected to the electric heater for permitting energization of the electric heater from a non-vehicular power supply when the container is outside the vehicle.

* * * * *